United States Patent
Zahn et al.

[11] Patent Number: 5,613,359
[45] Date of Patent: Mar. 25, 1997

[54] METHOD AND APPARATUS FOR REDUCING HYDROCARBON EMISSIONS FOR AN INTERNAL COMBUSTION ENGINE

[75] Inventors: Wolfgang Zahn, Ludwigsburg; Gunter Loose, Remseck; Erwin Strohmer, Bergien, all of Germany

[73] Assignee: Mercedes-Benz AG, Stuttgart, Germany

[21] Appl. No.: 368,498

[22] Filed: Jan. 4, 1995

[30] Foreign Application Priority Data

May 1, 1994 [DE] Germany ................. 44 00 202.5

[51] Int. Cl.⁶ .................................................. F01N 3/20
[52] U.S. Cl. ........................... 60/274; 60/284; 60/288; 60/297
[58] Field of Search ............................ 60/274, 284, 288, 60/297

[56] References Cited

U.S. PATENT DOCUMENTS

| | | |
|---|---|---|
| 5,051,244 | 9/1991 | Dunne et al. . |
| 5,307,627 | 5/1994 | Christensen ................. 60/300 |
| 5,373,696 | 12/1994 | Adamczyk ................. 60/289 |

FOREIGN PATENT DOCUMENTS

| | | |
|---|---|---|
| 0424966 | 5/1991 | European Pat. Off. . |
| 0460542 | 12/1991 | European Pat. Off. . |
| 3928760 | 3/1990 | Germany . |
| 9003204 | 10/1990 | Germany . |
| 4207005 | 9/1992 | Germany . |
| 4205496 | 1/1993 | Germany . |
| 2135126 | 8/1990 | Japan . |

*Primary Examiner*—Douglas Hart
*Attorney, Agent, or Firm*—Klaus J. Bach

[57] ABSTRACT

In a method and apparatus for reducing hydrocarbon emissions from an internal combustion engine during its cold-starting phase an adsorber, which adsorbs hydrocarbons below a desorption temperature and desorbs them above the desorption temperature, is arranged in a bypass conduit to the exhaust conduit and the exhaust gas is passed through the bypass conduit and the adsorber below the desorption temperature of the adsorber, and the bypass conduit is closed when a catalytic converter arranged close the engine in the exhaust conduit upstream of the bypass conduit reaches operating temperature and remains closed at least until a catalytic converter arranged downstream of the adsorber has reached operating temperature.

12 Claims, 1 Drawing Sheet

METHOD AND APPARATUS FOR REDUCING HYDROCARBON EMISSIONS FOR AN INTERNAL COMBUSTION ENGINE

BACKGROUND OF THE INVENTION

The invention relates to a method and apparatus for reducing hydrocarbon emissions from an internal combustion engine particularly during the cold-start phase of engine operation utilizing a catalytic converter and an adsorber.

U.S. Pat. No. 5,051,244, for example, discloses such a method for reducing hydrocarbon emissions. In an exhaust conduit of an internal combustion engine with a catalytic converter there is an adsorber for the adsorption of hydrocarbons upstream of the catalytic converter, the adsorber being arranged in a bypass conduit to the exhaust conduit. Arranged at the exit of the bypass conduit from the exhaust conduit is an on-off valve for controlling a flow connection between the exhaust conduit and the bypass conduit, control being performed, inter alia, as a function of the temperature of the adsorber.

With regard to the general background, attention is also drawn to printed publications DE 39 28 760 C2, DE 42 05 496 C1, 42 07 005 A1, German Utility Model 90 03 204, EP 0 424 966 A1, EP 0 460 542 A2 and JP 2-135126.

A disadvantage of known methods for reducing the hydrocarbon emissions from internal combustion engines is the fact that the desorption temperature of the adsorber is significantly below the operational temperature of the catalytic converter downstream of the adsorber, for which reason undesirably high hydrocarbon emissions occur in certain periods of the cold-starting phase.

It is the object of the invention to provide a method of reducing hydrocarbon emissions in such a way that a significant reduction in hydrocarbon emissions can be achieved also during the entire cold-starting phase of an internal combustion engine.

SUMMARY OF THE INVENTION

In a method and apparatus for reducing hydrocarbon emissions from an internal combustion engine during its cold-starting phase an adsorber, which adsorbs hydrocarbons below a desorption temperature and desorbs them above the desorption temperature, is arranged in a bypass conduit to the exhaust conduit and the exhaust gas is passed through the bypass conduit and the adsorber below the desorption temperature of the adsorber and the bypass conduit is closed when a catalytic converter arranged close to the engine in the exhaust conduit upstream of the bypass conduit reaches operating temperature and remains closed at least until a catalytic converter arranged downstream of the adsorber has reached operating temperature.

An advantage of the method according to the invention is the fact that a significantly better reduction in the hydrocarbon emissions than that in the known prior art can be achieved during the cold-starting phase of the internal combustion engine.

A further advantage of the method according to the invention is that, because the catalytic converter is arranged upstream of the adsorber close to the engine, a significantly smaller quantity of unburnt hydrocarbons reaches the adsorber than in the case of known methods and, as a result, the adsorption capacity of the sorbent is sufficient to adsorb the unburnt hydrocarbons until the operation temperature of the catalytic converter close to the engine is reached, even if the adsorbers are of compact design. Desorption of the adsorber is performed only after the catalytic converter remote from the engine (underfloor catalytic converter) has reached its operation temperature.

The oxygen required for the desorption of the hydrocarbons from the sorbent of the adsorber can be obtained in a simple manner by advantageous use of particular operating phases of the internal combustion engine.

The desorption temperature of the adsorber is reached only when the operation temperature of the catalytic converter close to the engine has been reached and, as a result, during the entire cold-starting phase emissions are reduced either by adsorption of the unburnt hydrocarbons by the adsorber or their catalytic conversion in the catalytic converter close to the engine.

DESCRIPTION OF THE PREFERRED EMBODIMENT

Figure 1:
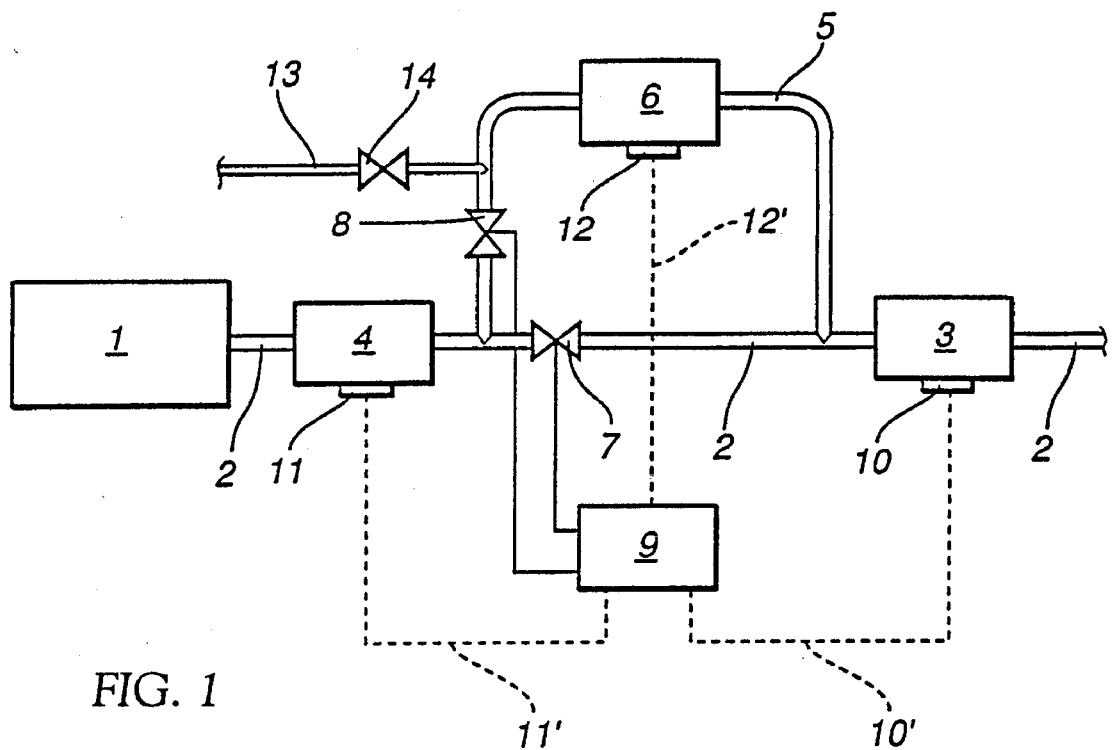
FIGS. 1 and 2 each shows schematically an embodiment of the emission control system according to the invention.

FIG. 1 shows, in a schematic representation, an internal combustion engine 1 with an exhaust conduit 2 in which are arranged a catalytic converter 3 remote from the engine (underfloor catalytic converter) and a catalytic converter 4 close to the engine.

A bypass conduit 5 to the exhaust conduit 2 is disposed between the catalytic converter 4 close to the engine and the remote catalytic converter 3 (e.g. a three-way catalytic converter).

Arranged in the bypass conduit 5 to the exhaust conduit 2, upstream of catalytic converter 3, is an adsorber 6, the sorbent of which adsorbs hydrocarbons below a desorption temperature and desorbs them above the desorption temperature.

In the exhaust conduit 2 there is an on-off valve 7 and, in the bypass conduit 5, there is an on-off valve 8, these two valves being intended for the control of a flow through the bypas conduit 5 and the exhaust conduit 2.

The method for reducing hydrocarbon emissions from the internal combustion engine 1 during its cold-starting phase comprises the following method steps, considered from the actuation of the ignition key to just after the operation temperature of the catalytic converter 3 remote from the engine has been reached:

1. Below an operation temperature of the catalytic converter 4 close to the engine which is arranged upstream of the bypass conduit 5, and below the desorption temperature of the adsorber 6, the exhaust gas is passed through the bypass conduit 5 and the adsorber 6.

2. When the desorption temperature of the adsorber 6 is reached, the bypass conduit 5 is closed by the on-off valve 8.

3. When the operation temperature of the catalytic converter 4 close to the engine is reached, the bypass conduit 5 is closed at least until the catalytic converter 3 arranged downstream of the adsorber 6 has reached operation temperature.

4. Above the operation of the catalytic converter 3 and above the desorption temperature of the adsorber 6, part of the exhaust gas can be passed through the bypass conduit 5 and the adsorber 6 to desorb the hydrocarbons from the sorbent of the adsorber 6.

Variant 4.A: hydrocarbon desorption is performed during operating phases of the internal combustion engine 1 with the engine braking (no fuel supply to the engine) by passing part of the exhaust gas (in the engine braking state essentially air) through the bypass conduit 5 and the adsorber 6.

Variant 4.B: for hydrocarbon desorption in the adsorber 6, the internal combustion engine 1 is operated for a short period with excess air while part of the exhaust gas is passed through the bypass conduit 5 and the adsorber 6.

Air can also be blown into the bypass conduit upstream of the adsorber 6 via a separate feed conduit 13 and an on-off valve 14. This air serves principally for the establishment of a stoichiometric mixture of exhaust gas before it enters the catalytic converter 3. Blowing in the air upstream of the adsorber 6 also makes it possible, by appropriate control of the air supply, to use this air for hydrocarbon desorption in the adsorber 6.

The on-off valves 7 and 8 are controlled by means of an evaluation and actuating device 9, the input parameters of which are the temperatures of catalytic converter 3, of the catalytic converter 4 close to the engine and of the adsorber 6, which are measured by means of temperature sensors 10, 11 and 12. The temperature sensors 10–12 are connected to the 5 evaluation and actuating device 9 by leads 10', 11' and 12' indicated by broken lines.

The sorbent of the adsorber 6 is fundamentally known, being composed of activated carbon, metal hydride or ceramic (zeolite), the sorbent adsorbing hydrocarbons at relatively low temperatures (e.g. below about 150°–200° C., depending on the sorbent) and desorbing hydrocarbons above a certain desorption temperature (e.g. above about 150°–200° C., depending on the sorbent).

The operation temperature of the catalytic converter 3 remote from the engine and that of the catalytic converter 4 close to the engine is about 300° C. By arranging catalytic converter 4 close to the engine and insulating the exhaust conduit between the outlet side of the internal combustion engine 1 and catalytic converter 4, the operation temperature of the latter is reached within about 2–50 seconds after starting, while the operation temperature of the catalytic converter 3 remote from the engine is reached only markedly later, depending on the way in which the internal combustion engine is operated.

To achieve hydrocarbon emissions which are as low as possible, it is expedient to design the apparatus for carrying out the method in such a way that the desorption temperature of the adsorber is reached only above the operation temperature of the catalytic converter 4 close to the engine such that method steps 2 and 3 described above occur simultaneously, with the result that either adsorption or catalytic conversion of the hydrocarbons takes place during the cold-starting phase. Since the operation temperature of catalytic converter 4 is about 100° C. higher than the desorption temperature of the adsorber 6 (depending on the sorbent of the adsorber 6), this is achieved by cooling the exhaust gas after it leaves the catalytic converter 4 close to the engine and before it enters the adsorber 6, with the result that, when the operation temperature of catalytic converter 4 is reached, the inlet temperature of the exhaust gas to the adsorber 6 is still below the desorption temperature of the latter. The exhaust gas can be cooled either by means of an exhaust conduit between catalytic converter 4 and adsorber 6 with a length corresponding to the quantity of heat to be removed from the exhaust gas or, in a further development of the invention, an exhaust-gas cooling device which is arranged in the bypass conduit 5 between the catalytic converter 4 and the adsorber 6 (e.g. exhaust conduit with cooling fins).

In order to avoid thermal overloading of the catalytic converter 4 close to the engine in the exhaust conduit 2, it can, in a manner fundamentally known, be integrated into a twin-tube casing which comprises an inner tube and an outer tube concentrically surrounding the latter. The inlet end of the twin-tube casing is connected to the exhaust conduit via a diffuser-like casing part in such a way that the exhaust gas is admitted both to the inner tube and to the annular passage between the inner tube and the outer tube. The outlet end of the twin-tube casing is connected to the exhaust conduit via a nozzle-like casing part. The catalytic converter 4 is situated between the inner tube and the outer tube. A controllable throttle valve is arranged in the inner tube. Until the operation temperature of the catalytic converter 4 is reached, the throttle valve in the inner tube is closed and the exhaust gas flows through the annular part of the twin tube and thus through the catalytic converter 4. Once the operation temperature of the catalytic converter 3 remote from the engine is reached, the catalytic converter 4 close to the engine is largely switched off by opening the throttle valve, as a result of which the majority of the exhaust gas flows along the path of least resistance, that is, through the inner tube of the twin-tube casing and only a small portion of the exhaust gas flows via the catalytic converter close to the engine.

Figure 2:
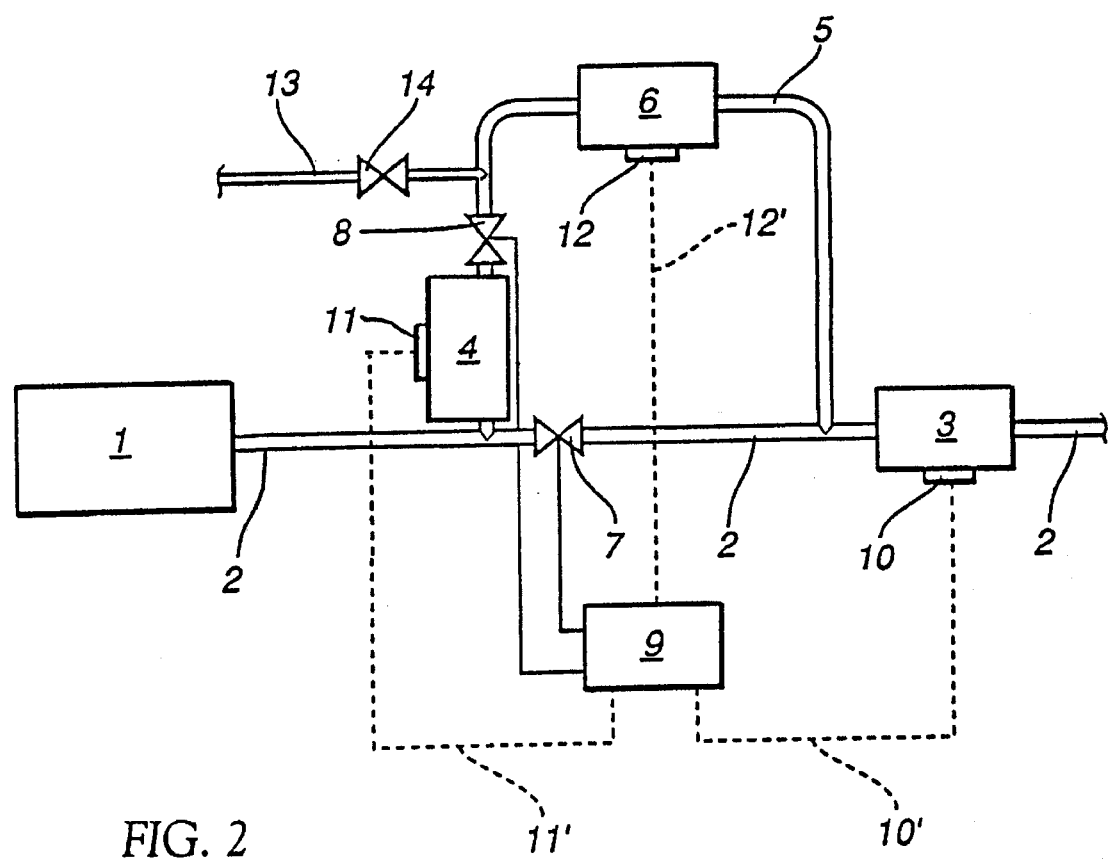

Protection of the catalytic converter close to the engine from thermal overloading can also be achieved if as shown in FIG. 2 the catalytic converter 4' is arranged in the bypass conduit 5 upstream of the adsorber 6. Particular attention must then be paid to adequate heat dissipation, for example, by means of a pipe with cooling fins between the adsorber and the catalytic converter close to the engine, at catalytic converter temperatures above the desorption temperature of the adsorber.

In a further development of the invention, the two on-off valves 6 and 7 can also be replaced by a single on-off valve arranged at the exit of the bypass conduit 5 from the exhaust conduit 2.

What is claimed is:

1. A method for reducing hydrocarbon emissions during a cold-starting phase of an internal combustion engine with an exhaust system including an exhaust conduit for discharging the exhaust gas from said engine and a first catalytic converter arranged in the exhaust system close to the engine and an adsorber with a sorbent which adsorbs hydrocarbons below a desorption temperature and desorbs them above the desorption temperature, arranged downstream of said first catalytic converter in a bypass conduit to said exhaust conduit, said exhaust system having a second catalytic converter arranged in said exhaust conduit downstream of said bypass conduit and means for controlling the exhaust gas flow through said bypass conduit and said exhaust conduit, the steps comprising, below an operating temperature of said first catalytic converter and below the desorption temperature of said adsorber, conducting the exhaust gas through said bypass conduit and said adsorber, below the operation temperature of said first catalytic converter and above the desorption temperature of said adsorber, closing the bypass conduit, above the operation temperature of said first catalytic converter and above the desorption temperature of said adsorber passing at least part of the exhaust gas through the bypass conduit and the adsorber for the desorption of the hydrocarbons, and closing said bypass conduit when the operating temperature of said first catalytic converter has been reached, at least until the operating temperature of said second catalytic converter has been reached.

2. A method according to claim 1, wherein hydrocarbon desorption is performed during operating phases of the internal combustion engine involving engine braking.

3. A method according to claim 1, wherein, for hydrocarbon desorption in the adsorber, the internal combustion engine is operated for a brief period with an excess of air.

4. A method according to claim 1, wherein, for hydrocarbon desorption in the adsorber, additional air is supplied to the adsorber when its temperature is above desorption temperature.

5. An apparatus for reducing hydrogen emissions from an internal combustion engine having an exhaust conduit, a bypass conduit for bypassing a portion of said exhaust conduit, an adsorber arranged in said bypass conduit, said adsorber including an adsorbent capable of adsorbing hydrocarbons below a desorption temperature thereof and of desorbing hydrocarbons above said desorption temperature, means for controlling exhaust gas flow selectively through the bypassed portion of said exhaust conduit or through said bypass conduit and the adsorber arranged therein, a first catalytic converter arranged in said exhaust conduit close to said engine, a second catalytic converter arranged in said exhaust conduit downstream of said bypass conduit, and means for cooling said exhaust gas on its path from said first catalytic converter to said adsorber, said exhaust gas conduit being insulated between said engine and said first catalytic converter to avoid exhaust gas heat losses before the exhaust gas reaches said first catalytic converter, said means for controlling the exhaust gas flow being adapted to conduct said exhaust gas through said bypass conduit as long as said first catalytic converter has not reached operating temperature for removing hydrocarbons from the exhaust gas of said engine in said adsorber.

6. An apparatus according to claim 5, wherein said means for controlling the exhaust gas flow includes on-off valves in the exhaust conduit and in the bypass conduit which can be controlled by way of an evaluation and actuating device.

7. An apparatus according to claim 6, wherein said first catalytic converter, said second catalytic converter and said adsorber each is provided with a temperature sensor, the measurement signals of said temperature sensors being input signals for the evaluation and actuating device.

8. An apparatus according to claim 5, wherein, for the removal of heat from the exhaust gas, the length of said exhaust conduit or said bypass conduit between said first catalytic converter and said adsorber is chosen to have sufficient heat dissipating surface such that, when the operating temperature of said first catalytic converter is reached, the exhaust gas temperature upstream of the adsorber is still below the desorption temperature of the adsorber.

9. An apparatus according to claim 5, wherein an exhaust gas cooling device is arranged in the bypass conduit upstream of said adsorber.

10. An apparatus according to claim 6, wherein an air feed conduit is connected to said bypass conduit upstream of said adsorber and an on-off valve which can be controlled by way of said evaluation and actuating device is arranged in said air feed conduit for controlling the supply of adsorber-desorbing air thereto.

11. An apparatus according to claim 5, wherein said first catalytic converter is arranged in said bypass conduit upstream of said adsorber.

12. An apparatus according to claim 5, wherein said first catalytic converter is arranged in said exhaust conduit upstream of said bypass conduit.

\* \* \* \* \*